April 29, 1952 E. BRUCE 2,594,389

DOUBLE-LOCKOUT INTERCONNECTING SYSTEM

Filed Aug. 4, 1948 2 SHEETS—SHEET 1

INVENTOR
E. BRUCE
BY
J W Schmied
ATTORNEY

April 29, 1952 E. BRUCE 2,594,389

DOUBLE-LOCKOUT INTERCONNECTING SYSTEM

Filed Aug. 4, 1948 2 SHEETS—SHEET 2

INVENTOR
E. BRUCE
BY J. W. Schmied
ATTORNEY

Patented Apr. 29, 1952

2,594,389

UNITED STATES PATENT OFFICE 2,594,389

DOUBLE-LOCKOUT INTERCONNECTING SYSTEM

Edmond Bruce, Red Bank, N. J., assignor to Bell Telephone Laboratories, Incorporated, New York, N. Y., a corporation of New York Application August 4, 1948, Serial No. 42,354

9 Claims. (Cl. 179—18)

This invention relates to improved interconnecting, selecting, and lockout control circuits for coordinate switching arrangements.

An object of the invention is to provide arrangements operating with speed and accuracy greater than heretofore for interconnecting individually any one of a plurality of devices, circuits, or paths, to any one of a plurality of other devices, circuits, or paths.

It is an object to provide arrangements such that each of the first group of devices, circuits or paths may be simultaneously conditioned for such a connection and from two to all of the devices, circuits or paths of the second group may be available for such a connection and that the several connections be established in such a manner that no double connections occur.

In accordance with an exemplary embodiment of the present invention discharge devices of the cold cathode type containing residual gas at low pressure are arranged in a multiple lockout array which permits the discharge to be fully initiated in one only of tubes associated with one device, circuit, or path and one only of the tubes associated with a device, circuit or path with which the first-named device, circuit or path is to be connected. After any path interconnecting two devices has been established by one tube the other tubes associated with the two devices, circuits, or paths are rendered incapable of further operation or ionization so long as the two circuits are connected together. In the meantime other circuits may be established between others of the devices, circuits, or paths of the two groups.

From a specific standpoint a feature of the invention is a connector circuit by means of which devices, such as senders, may be connected to other devices, such as markers, in a manner so that each sender has access to each marker when idle but also in a manner such that any sender can be connected with only one marker at a time and when so connected will not interfere with the connection of any other sender to any other idle or presently available marker.

From another standpoint the invention may be viewed as consisting of a number of devices which, when available, establish two circuit paths. Other devices to be connected to said devices, when available, each establish one circuit path. Conjoint establishment of the two paths and the one path leads to the establishment of a discharge in a multielectrode gaseous discharge device with a resultant first and second transfer of that discharge all incident to operation of an element which exclusively and uniquely upon operating controls the interconnection of the two devices.

Figure 1:
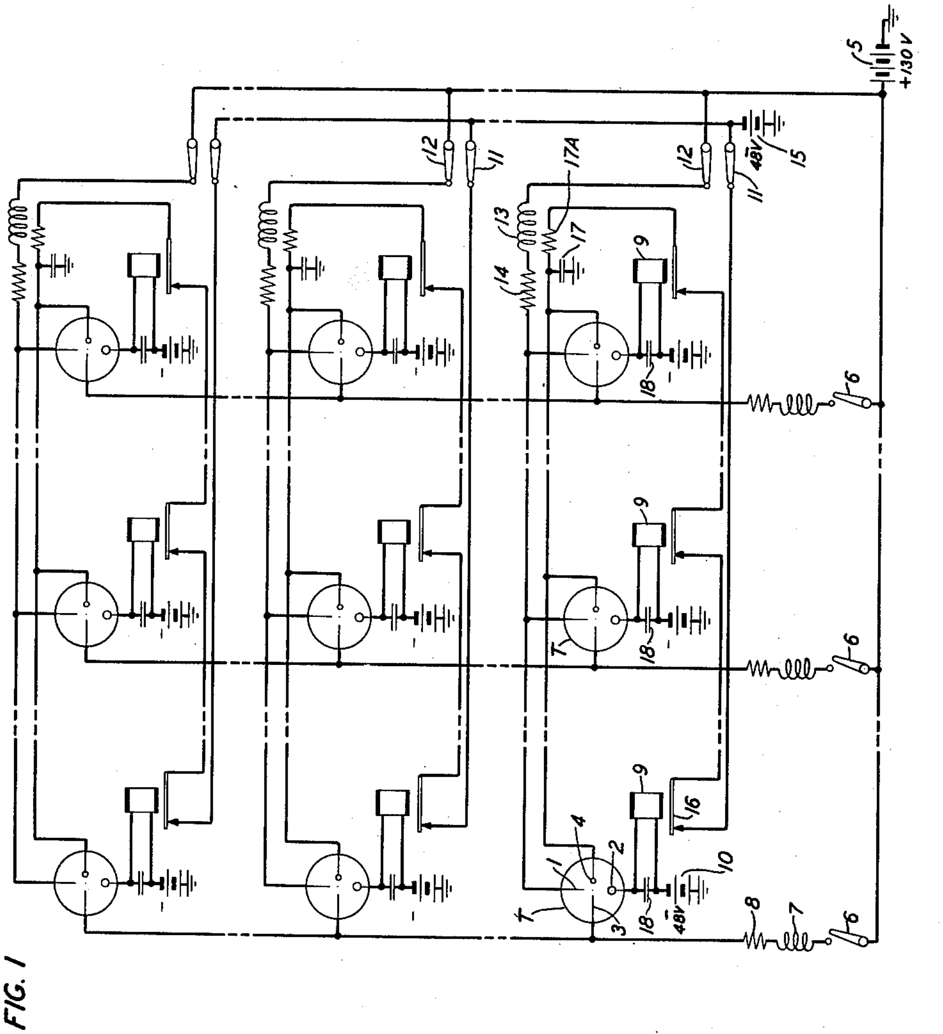
Figure 2:
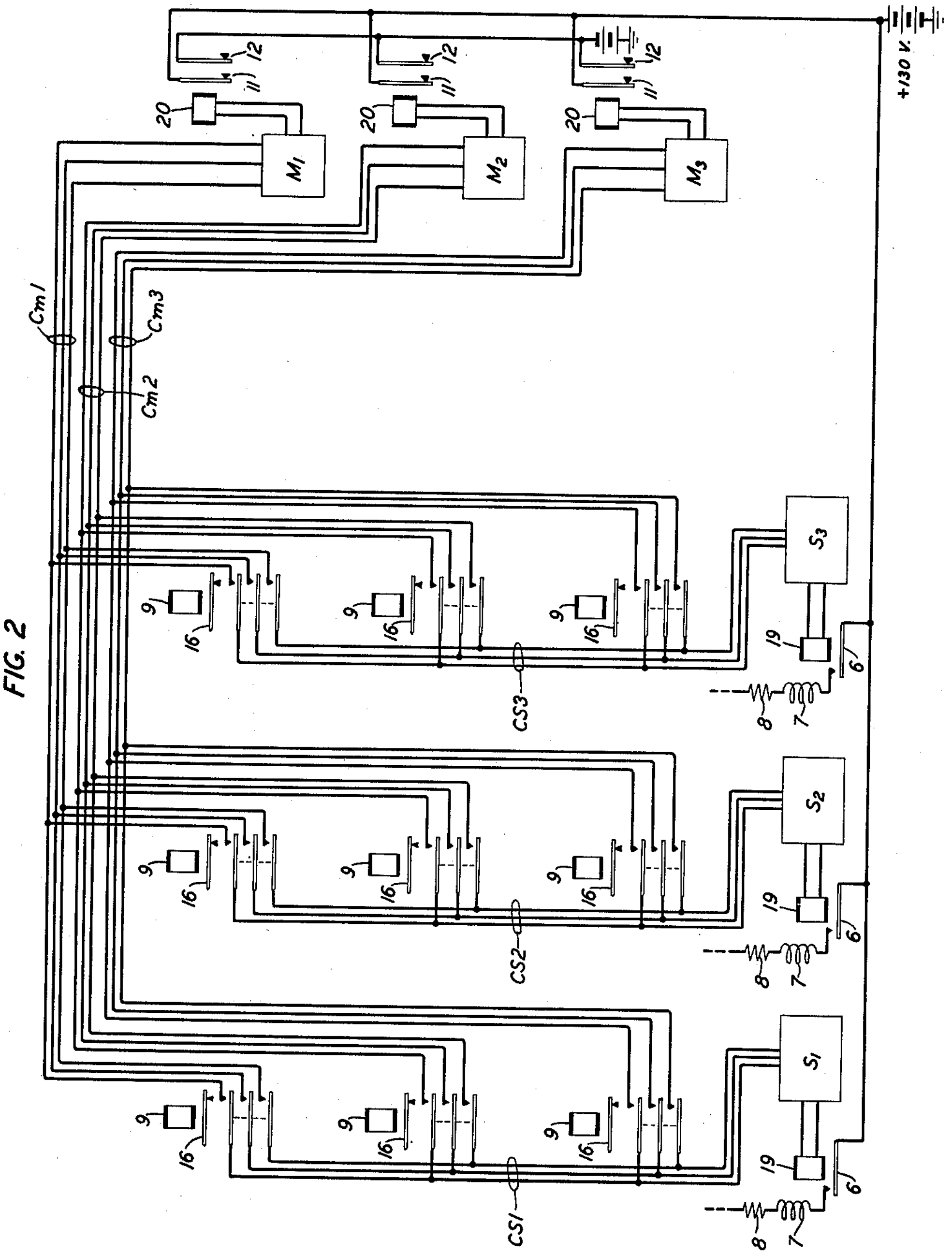

The nature and mode of operation of the essential elements of an exemplary embodiment of the invention will now be elucidated in connection with the accompanying drawings wherein:

Fig. 1 represents an array of discharge tubes arranged in groups which for reference may be designated vertical and horizontal groups, each said tube having associated therewith an electromagnetic relay; and Fig. 2 discloses how these electromagnetic relays when operated may interconnect any one of a group of senders to any one of a group of markers.

The apparatus of Fig. 1 may be sufficiently described by reference to its mode of operation.

Fig. 1 includes a group of four electrode discharge tubes T, of a type known to the art, in a coordinate array consisting of vertical columns and horizontal rows. Each device consists of a glass or other suitable envelope, a main anode 1, a main cathode 2, a supplementary anode 3 and a supplementary cathode 4. The supplementary cathode 4 and supplementary anode 3 are geometrically arranged to initiate and support a discharge under given conditions before the main electrodes will do so. Each tube or discharge device contains a small quantity of helium, argon or other suitable gas and those tubes may be as nearly alike as manufacturing variations will permit.

Let it be assumed that any or all pairs of circuit closing devices 11, 12 are operated to close their respective circuits. Let it also be assumed that some one circuit closing device 6 closes its circuit. A path extends a source 5 of electrical voltage of suitable constancy of voltage and power capacity through any closed one or more of a series of circuit closing elements 6, through an inductance of suitable electrical dimensions, said inductance being designated 7, and a resistance element 8, to the first supplementary anode 3 of a vertical column of discharge tubes, thence to the supplementary cathode 4, thence in a path in parallel through contacts of relays 9 and the circuit closing element 11 to negative battery 15. Sufficient voltage will be applied between the first supplementary anode 1 and the supplementary cathode 4 to initiate a discharge therebetween. This discharge may be initiated in a small time of the order of ten microseconds, more or less. The inductance 7 and resistance 8 produce a sufficient drop of potential so that only the first tube of a column will have such a discharge initiated therein. In other words, let it be supposed that the voltage applied to initiate the discharge is only slightly more than is necessary. The drop of potential will then be such that when a discharge is initiated that a discharge will not be initiated in more than one tube in the column. Upon the initiation of this discharge which may occur in a short period of time of the order of 700 microseconds, more or less, the gap in the tube between the supplementary anode 3 and the cathode 2 will be ionized and the current carrying path will be established from the battery 5 through circuit closing element 6, inductance 7, resistance 8, supplementary anode 3, cathode 2, to negative battery and ground through relay winding 9. This current may not be sufficient to activate the relay. While these events are taking place it will be seen that positive voltage is being supplied from the 130-volt source 5 to the main anode 1. In a further time of about 80 microseconds, more or less, the main gap is sufficiently ionized so that discharge current flows across the gap from the main anode 1 to the main cathode 2. As soon as the current flowing across the gap 1—2 through the relay winding 9 is sufficient and has had time to operate the relay, the armature 16 will move off its contact and open the path through the back contact of the relay 9 so that the 48-volt battery 15 is now removed from the circuit and the discharge path 3—4 is now open-circuited. The discharge which was existent between the cathode 3 and the anode 4 has now been transferred to a path extending from 130-volt positive battery through the circuit closing element 12, inductance 13, resistance 14, anode 1, cathode 2, winding 9 to negative battery 10 and ground. Inasmuch as there is a substantial drop of potential through the resistance 14 the voltage applied across the electrodes 1—2 of all the other tubes T in a horizontal row is lowered by the existing discharge through the first tube which has the discharge initiated therein, no further tube of the horizontal row will discharge. In a very short time after this the relay 9 has opened its back contact and thereby open-circuited the path to the supplementary cathode 4 of all tubes T of a row. This insures that no closure of some other circuit closing element 6 will initiate a pileup discharge in another tube of the same row until after the tube which is already discharging has been deactivated.

In an exemplary embodiment, the tube can be a Western Electric type No. 1492 in which the distance between the supplementary anode 3 and the supplementary cathode 4 is about 2 millimeters and the distance between the main anode 1 and the main cathode 2 is about 10 millimeters. A suitable value for the inductance 7 is 20 henries and the resistance of the element 8 is about 100,000 ohms. The inductance of the element 13 may be about 20 henries and the resistance of the element 14 is about 1700 ohms. Battery 5 may be 130 volts, battery 15, 48 volts and battery 10, 48 volts. The function of the condenser 17 which may have a capacity of 0.1 mf. is as follows:

Lockout between tubes in a column is most effective when the associated impedance individual to a row, such as resistance 17A, is at a minimum at the instant of the beginning of active ionization. At this instant, condenser 17 effectively short-circuits the resistance 17A. Likewise lockout between tubes in a row is most effective when the individual impedances of relays 9 are short-circuited by condensers 18 during the initial period of ionization. A suitable value for the condenser 18 is 0.1 mf. The resistance of relay winding 9 may be about 1500 ohms and this relay will operate upon a current of about 20 milliamperes to operate its armature 16 to open contact position together with any other armatures which may be associated therewith.

We have now discussed the operation when all the circuit closing devices 11 and 12 have been closed and some one path closing device 6 is closed and have shown that this will result in the activation of just one tube T with transfer of its discharge to the principal electrodes and the operation of just one relay 9. With proper circuit constants there is a characteristic feature of this array of tubes and other circuit elements which renders it of general application and a broad field of utility as will now be described. Let it be supposed that several pairs of circuit closing elements 11, 12 are closed and that several switches 6 are closed simultaneously or in extremely rapid succession. Only one tube T of the column associated with each circuit closing switch 6 will be activated due to the lockout effects of the inductance-resistance combination 7, 8. No matter which tube this is it will likewise transpire that the other tubes of the horizontal row in which the first-named tube is located will first be temporarily locked out and then locked out for the duration of the closure of the switch 6 by resultant operation of the relay 9 associated with a particular tube. Operation of two relays in a column or in a row will thereby be prevented although ordinarily one will not be able to forecast which relay in a column and which relay in a row will be operated.

Reference is now made to Fig. 2 wherein circuit closing elements 6 now constitute armatures of relays 19 and associated front contacts. It may be assumed that each relay 19 is associated with a sender $S_1$, $S_2$, $S_3$, etc. and that each relay 19 is controlled by its associated sender so that the relay is energized to close its contact whenever the sender requires to be connected to a marker. A series of markers are designed $M_1$, $M_2$, $M_3$, etc. and each marker has associated therewith a relay 20 which is released when the marker is idle and available. Relay 20 of the seized marker remains released until the marker has performed its function in the telephone system whereupon it again becomes momentarily operated and released. The operation and release of relay 20 of a marker is accomplished through control means internal to or associated with the marker, said control means being operable in a known fashion. Incident to release of relay 20 it closes two back contacts which correspond respectively to the contacts 11 and 12 of Fig. 1; in other words, the armatures of relay 20 take the place of the circuit closing elements 11 and 12 and are correspondingly designated. It is understood that they closes their respective contacts when their respective associated relays are deenergized. The tubes T are not shown in Fig. 2 but their associated relays 9 with armatures 16 are shown and it is understood that this array of tubes is associated with batteries and that the contacts 6, 11, 12 and elements such as 7, 8, 13, 14, 17 and 18 are present and are connected as indicated in Fig. 1. In the telephone art the number of leads by which a sender requires to be connected to a marker is known for each type of telephone system but may vary somewhat dependent upon the type of system. This number of leads may be quite considerable. The exact number is not of primary consequence to this invention which is capable of associating a sender with a marker by any number of conductive leads within reasonable limits; for example, any desired number from 1 to 100. It will be seen that such a system of conductors designated *Cs1* extends from each sender $S_1$ and a similar system *Cs2* extends from a similar sender $S_2$, etc. These conductors all terminate on sets of armatures on the column of relay 9. It will be seen that each marker has extending therefrom a corresponding set of conductors and that when any one relay 9 associated with any particular marker is closed this set of conductors is extended through to the marker. Thus the conductors *Cm1* extend from the marker $M_2$ to the upper row of front contacts of relays 9, the conductors *Cm2* extend to the second row, etc. It will be seen by extending the array that there may be any reasonable number of senders and any reasonable numbers of markers. Let it now be considered that when any particular marker $M_1$, $M_2$, etc. is idle its associated relay 20 is released and that when any particular sender $S_1$, $S_2$, etc. requires connection to a marker its relay 19 becomes energized. It has already been shown by reference to Fig. 1 that only one relay 9 in a column can become energized at the same time and that only one relay 9 in a row may become energized at the same time. In consequence of this, each sender, when it requires a marker, is connected to one marker and one marker only.

The sender may be connected to the marker for such time and over such leads as is necessary to transfer whatever information is necessary or desirable from the sender to the marker and/or vice versa and to exercise the necessary intercontrol at which time the connection of the sender to the marker is no longer necessary. Upon delivery of all the information which the sender should deliver to the marker it may release the relay 19 in a known fashion by means internal to or controlled by the sender, thus rendering the sender available for other use. However, neither that sender nor any other sender may be connected with a previously seized marker so long as the relay 20 of the marker is unenergized, that is, unoperated because one of the relays 9 of the horizontal row of tubes associated with the particular marker will remain operated and, consequently, no discharge across the electrodes 3 and 4 of any of the tubes of that row can occur. After the marker has performed its function it causes relay 20 to be energized and coincidently causes release of the relay 9 which established the connection to thereby open its contact 16. The operation and release of relay 20 are accomplished by internal relay and circuit means in or controlled by the marker and of a nature well understood in the art. The tube T which established this particular connection extinguishes upon the opening of contacts 11, 12. Thereafter, this marker maintains its relay 20 released and remains busy until it has performed all its intended functions. Immediately after completion of its functions the marker causes its associated relay 20 to release. The marker is now again restored to an "available" condition because contacts 11, 12 are closed, and all tubes of its row are extinguished. Consequently, if a sender $S_1$ has been connected with a connector $M_1$ and thereafter another sender such as $S_2$ requires connection to another marker before marker $M_1$ is idle, sender $S_2$ will become connected with some other marker such as $M_2$ or $M_3$ assuming that some other one is idle. If none is idle the sender will have to wait as will be seen by reference to Fig. 1 because unless and until the pair of circuit establishing elements 11, 12 are closed there will be no circuit by which closure of contact 6 can initiate a discharge in any tube of its associated column. It will become apparent that if the markers require more time than the senders to perform their respective functions, it might be necessary to provide a number of markers greater than the number of senders.

In a broad aspect the invention is not limited to interconnection of senders with markers. It could equally well be employed in analogous manner for the interconnection over a suitable number of conductors from any one of a series of units with any one of a series of other units so that each connection during its existence is unique. The necessity for separate sequencing or allotting circuits or their equivalents is avoided. In other words, the elements of one series such as the senders $S_1$, $S_2$, etc. may close their respective contacts calling for connection with an element of the other series of devices such as the markers $M_1$, $M_2$, etc. in any order and at any time. It is observed that the relays 9 are indicated as multi-contact relays. If the number of conductors required to be extended is too great a plurality of relays 9 may be arranged with their windings in series or multiple to perform the desired function or each relay 9 may control one or more other relays whereby the desired number of conductors may be extended.

Furthermore, the inductance 7 and associated resistance 8 are not the only form of impedance elements combination which may be utilized to accomplish the desired lockout of other tubes of a column except one and likewise a similar statement may be made with respect to the inductance 13 and resistance 14 and a row of tubes. These pairs of elements typify different forms of impedance elements known in the art for accomplishing the desired lockout function.

What is claimed is:

1. An array of discharge tubes of the type including residual gas and having in each tube a pair of main electrodes and a pair of supplementary electrodes, means including circuit closing devices for applying voltage across pairs of supplementary electrodes simultaneously or successively, means including circuit closing means for applying potentials across pairs of main electrodes simultaneously or successively, means for initiating electrical discharges in said tubes as the result of said applications of potentials, lockout means whereby one tube in a column has a discharge initiated therein at a time, and lockout means whereby only one tube in a row has a discharge initiated therein at a time.

2. An array of gaseous discharge devices arranged in two sets of rows, one of which sets of rows is transverse to the other and includes a plurality of devices of the other set, said devices being provided with supplementary electrodes and main electrodes, means for applying breakdown potentials to the supplementary electrodes of a row to cause a discharge therebetween, and second potential applying means capable of operating and functioning simultaneously with the first-named potential applying means for supplying potentials to the main electrodes of a row transverse to the first-named row, said potentials applied to the main electrodes being of such value that any discharge initiated between supplementary electrodes of the devices tends to transfer to the main electrodes thereof, means for preventing discharge between the supplementary electrodes of more than one device of a row, and means for preventing a transfer of discharge in two or more devices of a row transverse to said first-named row even though supplementary discharges in two or more devices of said first-named row exist.

3. In combination, a group of senders, a group of markers, switching apparatus for establishing a connection of any sender to any marker including a plurality of discharge tubes one of which is individual to each possible interconnection between a sender and a marker, means tending simultaneously to cause discharges in a first group of said tubes whereby some unpredetermined one of said tubes is caused to discharge, means connected to said first group of tubes operative incident to said discharge and controlled thereby to prevent said means from fully establishing a discharge in a second of said first group of tubes, means rendered by one idle marker equally available to said discharging tube and other tubes forming a second group common to one marker for causing a transfer of any discharge existent in a tube of said second group whereby said discharge is transferred in said one tube, and apparatus responsive to the transfer to establish a connection between the sender and the marker to which said one tube is individual.

4. In a system in accordance with claim 3, further means tending to cause a discharge in a tube of a third group of said tubes which includes a tube of said second group, means whereby a continuing discharge in said tube common to said first and second groups establishes a preferential condition whereby a tube common to said second and third groups is prevented from discharging in favor of creating a discharge in some other tube of said third group.

5. In combination, an array of tubes, each of which has a primary discharge path and a principal discharge path, a series of priming start elements, paths whereby each such element may be connected to supply potentials at one time to the priming discharge paths of a plurality of said tubes, series impedance common to said paths of said plurality whereby initiation of a priming discharge in one said tube of said plurality lowers the voltage on others of said plurality of tubes to non-discharging value, a series of principal start elements, principal paths including sources of voltage whereby any number of said principal start elements from one to the entire series may be connected, each to its own plurality of said principal discharge paths, circuit connections whereby upon the connection of said principal start elements to a plurality of said principal discharge paths, said plurality always includes one principal discharge path in one tube having a priming discharge path common to the plurality of tubes connectable to each start element whereby in said one tube the discharge transfers to the principal discharge path of said tube, and connecting means operable incident to said transfer whereby a circuit path unique to said one tube may be established.

6. In a combination according to claim 5, other means operable incident to the operation of said connecting means for inhibiting supply of starting potentials to the priming discharge paths of the plurality of tubes to which the one of said principal start elements which caused the transfer is connected so long as it remains connected.

7. A series of seizing elements and a series of elements to be seized, an array of tubes having priming and principal discharge paths, circuit closing means whereby any seizing element to be connected to an element to be seized energizes a plurality of said priming discharge paths simultaneously, impedances connected to said paths whereby a random one of said priming discharge paths upon discharge reduces the voltage on others thereof below discharging value, conditioning means individual to each of said elements to be seized each having circuit closing means for energizing principal discharge paths of a plurality of said tubes, transfer means for energizing the principal discharge path of a tube conditioned by said conditioning means upon existence therein of said priming discharge, and means including a connecting device operable upon said energization of a principal discharge path to establish a connection of the seizing element which initiated the priming discharge in a tube and the element to be seized having the conditioning means individual to said element to be seized which conditioned the principal discharge path in said same tube.

8. In a combination according to claim 7, means whereby a plurality of circuit closing means operated by a plurality of seizing elements operated simultaneously establish a lock-out condition whereby only one priming discharge path in tubes having principal discharge paths energizable by conditioning means individual to one element to be seized may be caused to discharge.

9. In a combination according to claim 7, holding means individual to a seized element rendered effective for holding an established connection of a seizing and said seized element, means for maintaining a principal discharge and inhibiting a primary discharge in a discharge tube operated to establish a connection of said elements during the operation of said holding means, and means for suppressing all discharge in said last-named tube upon assumption of said holding means to non-holding condition.

EDMOND BRUCE.

REFERENCES CITED

The following references are of record in the file of this patent:

UNITED STATES PATENTS

| Number | Name | Date |
|---|---|---|
| 2,291,224 | Hall | July 28, 1942 |
| 2,291,752 | Parker | Aug. 4, 1942 |
| 2,310,452 | Meacham | Feb. 9, 1943 |
| 2,317,471 | Meacham | Apr. 27, 1943 |
| 2,326,551 | Mohr | Aug. 10, 1943 |